(No Model.)
M. CASHIN.
FISHING REEL.
No. 390,752. Patented Oct. 9, 1888.
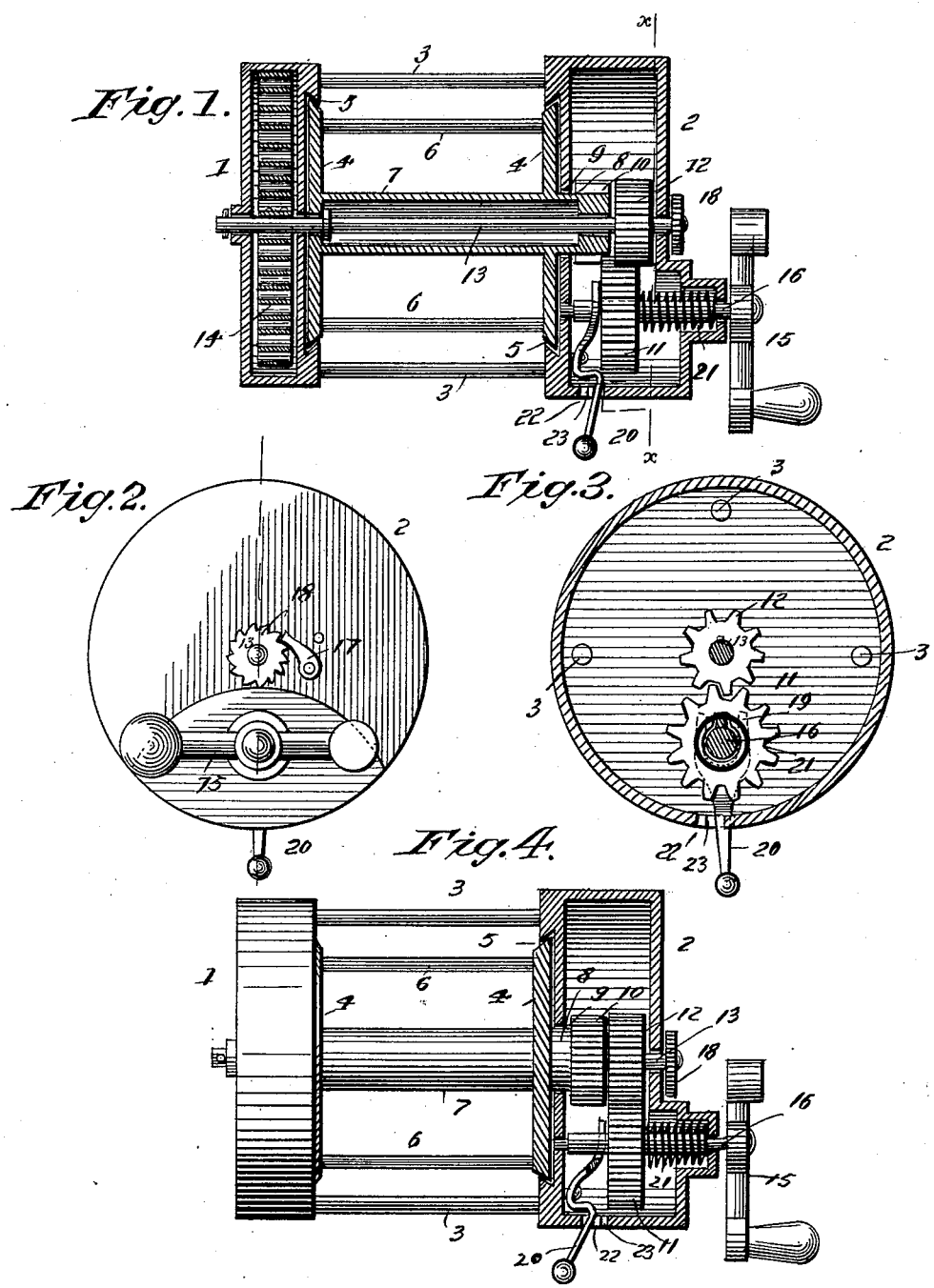
WITNESSES:
Phil C. Dieterich
C. Sedgwick
INVENTOR:
M. Cashin
BY Munn & Co.
ATTORNEYS.

UNITED STATES PATENT OFFICE.

MICHAEL CASHIN, OF NEW YORK, N. Y.

FISHING-REEL.

SPECIFICATION forming part of Letters Patent No. 390,752, dated October 9, 1888.

Application filed June 15, 1888. Serial No. 277,228. (No model.)

*To all whom it may concern:*

Be it known that I, MICHAEL CASHIN, of the city, county, and State of New York, have invented a new and Improved Fishing-Reel, of which the following is a full, clear, and exact description.

This invention relates to fishing-reels, and has for its object to provide a fishing-reel which will automatically wind up the line when a fish is hooked, and by means of which the control and winding and unwinding of the line may be readily effected.

The invention consists in a fishing-reel constructed and arranged as hereinafter described and claimed.

Reference is to be had to the accompanying drawings, forming a part of this specification, in which similar letters of reference indicate corresponding parts in all the figures.

Figure 1 is a view in vertical section of a reel constructed according to this invention. Fig. 2 is an end view thereof. Fig. 3 is a vertical transverse section on the line $x\,x$, Fig 1; and Fig. 4 is a view of the reel, partly in section, showing a portion of the operating mechanism.

The reel is constructed with boxings or casings 1 2, connected together by rods 3, and the rotary portion, on which the line is to be wound, consisting of disks 4, located in recesses 5 on the inner face of the boxings 1 2, and connected by rods 6, and a tubular shaft, 7, having an extension, 8, projecting through a hole, 9, into the boxing 2. The extension 8 is provided with a pinion, 10, gearing with a pinion, 11, which in turn gears with a pinion, 12, on a shaft, 13, projecting through the boxings 1 2 and the hollow shaft 7. Within the boxing 1 is located a spiral spring, 14, having one end secured to shaft 13 and the other to the boxing 1. The spring 14 is wound up by means of a crank-handle, 15, on the shaft 16, on which pinion 11 is mounted, motion being transmitted thereby to pinions 10, 11, and 12 and shaft 13. The spring 14 is held in wound position by means of a pawl, 17, on the exterior of boxing 2, engaging a ratchet, 18, on the end of shaft 12.

In winding up spring 14, as above described, the fishing-line may be also wound upon the rotary line-winding portion by the motion communicated thereto through pinion 10 on tubular shaft 7.

In order that the spring 14 may be wound up independently of the line-winding rotary portion, and also that the latter may be free to rotate and let the line unwind, the pinion 11 is mounted on shaft 16, so as to be moved in and out of engagement with pinion 10. This is effected by means of the pinion 10 engaging a spline, 19, on shaft 16, and being slid on the latter by a lever, 20, pivoted in boxing 2 and bearing against one side of the pinion, and a reacting-spring, 21, on shaft 16, bearing against the other side of the pinion. The lever 20 projects through an opening, 22, in the boxing 2 and holds pinion 10 against the tension of spring 21 and in engagement with pinion 12 by means of notches 23, with which the lever 20 may be moved into engagement.

It will thus be seen that with pinion 11 meshing with pinions 10 and 12, upon turning the crank-handle 15 the spring 14 and the line may be wound up, the pawl 17 and ratchet 18 holding the spring in wound position. The position of the reel when the rod is held for fishing will be such that the pawl 17 in engagement with ratchet 18 will be located beneath the latter, so that upon a fish being hooked the pull on the line will release the ratchet from the pawl and the latter will drop out of engagement therewith. The spring 14, being thereby released, will, through the train of gearing 10 11 12, cause the line to be wound up and pull in the fish.

If it be desired to slacken the line and let the fish run, it is simply necessary to move the pinion 11 by means of lever 20 out of engagement with pinion 10, when the rotary line-winding portion is free to turn on the shaft 13. By releasing lever 20 the pinion 11 may be moved back into engagement with pinion 10 by the action of spring 21, and the line may then be wound up by means of crank-handle 15.

By means of this invention a reel is provided which will automatically draw in a fish, and which can be effectively operated and controlled.

Having thus described my invention, what I claim as new, and desire to secure by Letters Patent, is—

1. In a fishing-reel, the combination of a tubular shaft provided with a pinion, a shaft to which one end of the spring is attached, passing through the tubular shaft and provided with a pinion, a counter-shaft provided with a crank-handle, a sliding pinion on said counter-shaft, and means for moving said sliding pinion on its shaft, substantially as described.

2. In a fishing-reel, the combination, with the reel proper, provided with a tubular shaft having a pinion at one end, of a shaft projecting through the tubular shaft and having one end connected to a spring and its other provided with a pinion, a counter-shaft provided with a crank-handle, a sliding and spring-pressed pinion on said counter-shaft, and a lever for sliding said pinion on its shaft, substantially as herein shown and described.

3. A fishing-reel constructed with a line-winding reel having a pinion, and a pinion meshing therewith and sliding on its shaft and held thereon to turn with it by means of a spline, a crank-handle for turning the pinion, and a lever and reacting-spring for moving the pinion in and out of gear with the line-reel pinion, substantially as shown and described.

4. A fishing-reel constructed with a line-winding reel loosely mounted on a shaft, a spring connected with the shaft for winding up the line-reel, a pawl and ratchet controlling the shaft and spring, a pinion on the line-reel and a pinion on the shaft, a pinion meshing with the shaft and reel pinions and connected to its shaft by a spline, a crank-handle for turning the same, and an adjustable lever and reacting-spring for moving the pinion in and out of gear with the reel-pinion, substantially as shown and described.

5. A fishing-reel constructed with boxings 1 2, a shaft, 13, projecting through the boxings and having a winding-spring, 14, pawl 17, and ratchet 18, and a pinion, 12, located in boxing 2, a line-winding reel loosely mounted on shaft 13 and having a pinion, 10, located in boxing 2, a sliding pinion, 11, meshing with pinions 10 12 and connected to shaft 16 by spline 19, a lever, 20, bearing against one side of pinion 11, projecting through opening 22 in boxing 2, having notches 23, a reacting-spring, 21, bearing against the other side of pinion 11, and a crank-handle, 15, on shaft 16, substantially as shown and described.

MICHAEL CASHIN.

Witnesses:
DANIEL McDEVITT,
EDWARD F. WHELAN.